Aug. 8, 1944.   H. W. CARDWELL   2,355,272
POWER TAKE-OFF
Filed April 14, 1942   2 Sheets-Sheet 1
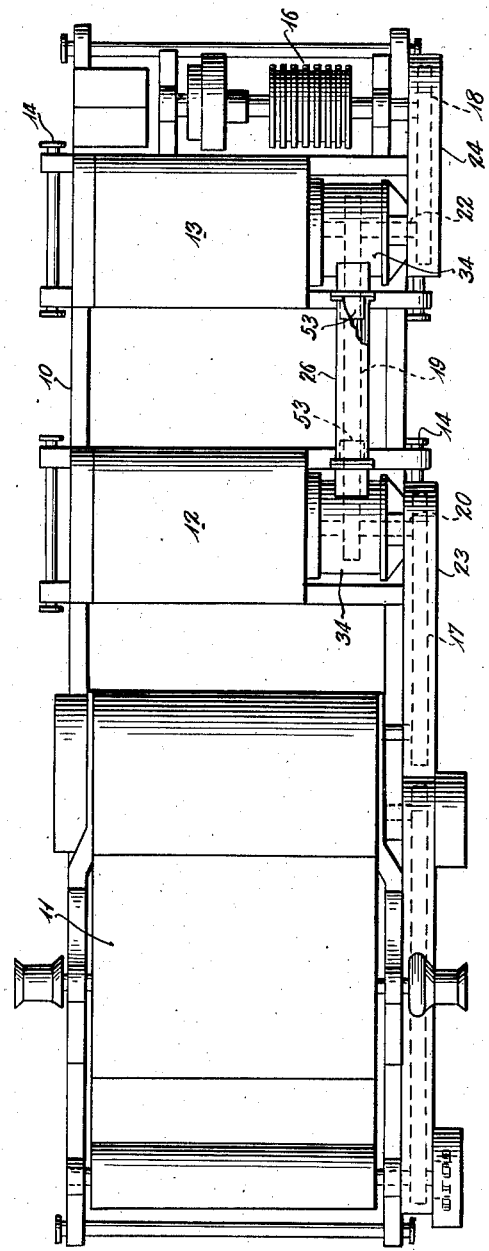
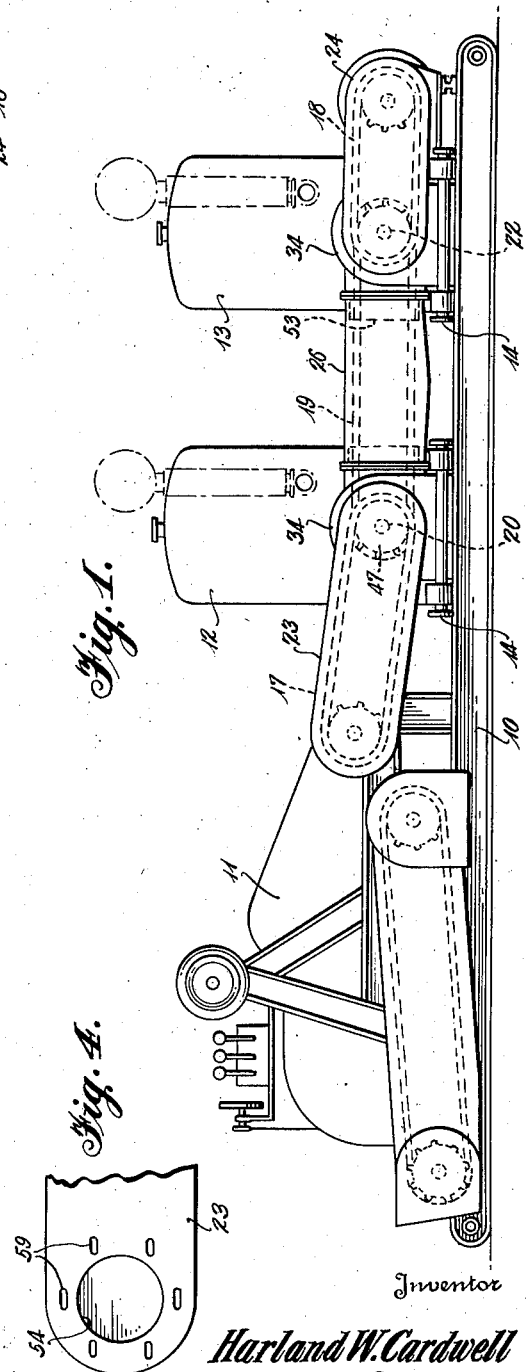
Inventor
Harland W. Cardwell
By Bacon & Thomas
Attorneys Patented Aug. 8, 1944

2,355,272

UNITED STATES PATENT OFFICE 2,355,272

POWER TAKE-OFF

Harland W. Cardwell, Wichita, Kans., assignor to Cardwell Manufacturing Company, Inc., Wichita, Kans.

Application April 14, 1942, Serial No. 438,959

9 Claims. (Cl. 74—216.5)

This invention relates to a power take-off and more particularly to a power take-off in which a minimum number of bearings may be employed and in which driving chains may be readily enclosed in oil-tight casings which are adjustable in length to provide for tightening said chains.

The present invention has particular utility for draw works for oil drilling equipment but may be employed for transmitting power for other purposes. In draw works for well drilling a plurality of internal combustion engines or other prime movers may be employed and arranged to drive the various units of the equipment such as rotary tables, hoisting equipment and pumps, either with the engines connected individually to certain of the units or with all of the engines connected together to drive one or more units of the apparatus. Thus, the various prime movers are usually capable of being connected to and disconnected from their various power take-off shafts through friction or other clutches and additional clutches may be employed for interconnection between the power take-off shafts and the various elements of the apparatus. The power take-off shafts as well as the driving shafts for the various units ordinarily are provided with one or more sprockets, certain of which may be connected to or disconnected from the shaft upon which they are mounted with chains engaging the various sprockets for transmission of power. It has heretofore been the practice to provide the power take-off shafts for the prime movers with at least two bearings other than the bearing for the main shaft of the prime mover and to employ a flexible connection between the power take-off shaft and the main shaft of the corresponding prime mover.

In accordance with the present invention one end of each power take-off shaft is journaled in a bearing carried by the main shaft or flywheel of the internal combustion engine or other prime mover and a single additional bearing is employed for each power take-off shaft. By this construction alignment difficulties are overcome as the bearings, particularly the single additional bearing, may be of the self-aligning type and the support for such bearing may be secured directly to the frame of the internal combustion engine so that accurate alignment is at all times maintained. Furthermore, the oil shield or casing structure for the various sprocket chains may be much simplified over prior constructions, thus enabling the oil casings to easily be made adjustable in length so that the various internal combustion engines or other prime movers and the units of the mechanism driven thereby can be moved relative to each other in order to maintain the sprocket chains at the desired tightness.

It is, therefore, an object of the present invention to provide an improved power take-off for an internal combustion engine or similar source of power.

Another object of the invention is to provide an improved power take-off structure including sprocket chains which enables adjustable length oil casings for such chains to be readily provided.

A further object of the invention is to provide an improved power take-off shaft structure having all bearings therefor supported from the frame of the internal combustion engine or other prime mover.

A still further object of the invention is to provide an improved power take-off structure providing for adjusting the tightness of sprocket chains employed therein and in which bearing alignment difficulties are minimized.

Other objects and advantages of the invention will appear in the following description of a preferred embodiment of the invention shown in the attached drawings, in which:

Fig. 1 is a side elevation of a draw works incorporating the present invention;

Fig. 2 is a plan view of the draw works of Fig. 1;

Fig. 4 is a fragmentary view illustrating the adjustable structure of one of the oil shields.

Figure 3:
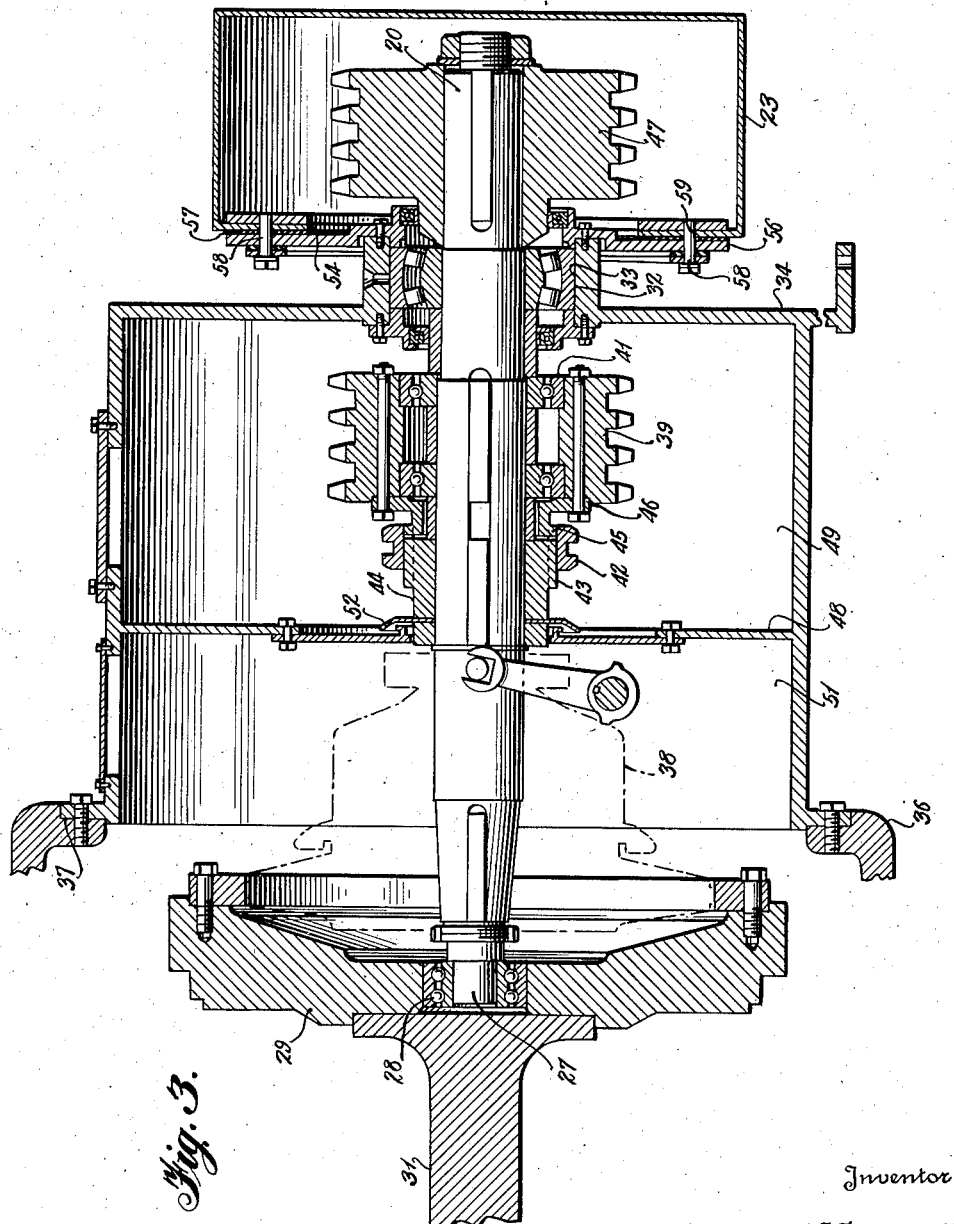
Fig. 3 is a vertical section through a power take-off shaft aligned with the crankshaft of an internal combustion engine.

Referring to Figs. 1 and 2, a draw works incorporating the present invention may include a frame member 10 upon which is mounted hoisting equipment 11 which may include a drive for a rotary table (not shown). A pair of or three or more internal combustion engines or other prime movers 12 and 13 may likewise be mounted upon the frame 10 and be arranged for adjustable movement longitudinally of the frame 10 by adjusting means shown diagrammatically at 14. A pump power take-off mechanism shown diagrammatically at 16 may also be mounted upon the frame 10 and arranged for adjustment longitudinally thereof by suitable adjusting means (not shown).

The hoisting equipment 11 may be driven from the engine 12 through a sprocket chain 17 and the pump power take-off 16 may be driven from the engine 13 through a sprocket chain 18. A sprocket chain 19 may connect the power take-off shafts 20 and 22 of the engines 12 and 13, respectively. The chain 17 may be enclosed in an oil casing 23, while the chains 18 and 19 may be enclosed in oil casings 24 and 26, respectively.

The structure of the power take-off shafts 20 and 22 and associated apparatus is more clearly shown in Fig. 3. Since the power take-off shaft 22 and its associated apparatus may be similar in all substantial details to that of power take-off shaft 20, only the shaft 20 and associated apparatus is shown in Fig. 3. Referring to Fig. 3, the power take-off shaft 20 may have its end 27 reduced in diameter and journaled in a bearing 28, preferably of the anti-friction type carried in a central aperture in a flywheel 29 secured to the crankshaft or main shaft 31 of the internal combustion engine 12. The only other support for the shaft 20 may be a bearing 32 preferably of the self-aligning anti-friction type positioned intermediate the ends of the shaft 20. The bearing 32 may be supported in alignment with the bearing 28 in an aperture 33 in a housing 34 rigidly secured to the frame 36 of the internal combustion engine so that the housing 34 and bearing 32 may be moved as a unit with an internal combustion engine, such as the engine 12 of Fig. 1. By machining the aperture 33 carrying the bearing 32 at the same time that the seat 37 on the housing 34 is machined, accurate alignment of the aperture 33 and bearing 32 with the bearing 28 can be easily obtained.

The shaft 20 may carry a friction clutch 38 shown diagrammatically in outline in Fig. 3 for connecting the flywheel 29 in driving relation with the shaft 20. The clutch 38 may be of any suitable or conventional type and the details thereof are not shown. The shaft 20 may also carry a power transferring element such as a sprocket 39 loosely journaled by means of an anti-friction bearing 41 on the shaft closely adjacent the bearing 32 and intermediate this bearing and the bearing 28. A positive clutch including a clutch ring 42 having internal splines slidable in external splines 43 carried by a collar 44 keyed to the shaft 20 may be moved into and out of engagement with teeth 45 upon a collar 46 bolted to the sprocket 39 by any suitable means (not shown). The clutch thus provided may be employed to connect sprocket 39 in driving relationship with the shaft 20 or disconnect said sprocket from the shaft 20. The shaft 20 may also carry another power transferring element such as a sprocket 47 on the opposite side of the bearing 32 from the sprocket 39. The sprocket 47 is preferably positioned closely adjacent the bearing 32 and will ordinarily be keyed directly to the shaft 20.

The housing 34 may be provided with an internal partition 48 between the clutch 38 and the sprocket 39 dividing the housing into a sprocket compartment 49 and a clutch compartment 51. An oil baffle structure including an oil ring 52 carried by the shaft 20 is provided for preventing passage of oil from the sprocket compartment 49 into the clutch compartment 51. As shown in Figs. 1 and 2, the housing 34 for the power take-off shafts 20 and 22 may have laterally projecting portions 53 telescoping with the oil casing 26 so as to provide for relative movement between the engines 12 and 13 longitudinally of the frame 10.

The structure of the oil casing 23 is more clearly shown in Figs. 3 and 4 and may have an opening 54 closed by a supporting ring 56 secured to and forming a part of the housing 34. A gasket 57 may be positioned between the ring 56 and the casing 23 to prevent leakage of oil and the casing 23 may be secured to the ring 56 by means of suitable bolts 58. As shown in Fig. 4, the apertures 59 in the casing 23 through which the bolts 58 extend may be elongated in a direction longitudinally of the oil casing 23 to provide for movement of the engine 12 longitudinally of the frame 10 with respect to the hoisting equipment 11. The oil casing 24 may have a structure similar to that just described with reference to oil casing 23 to provide for relative movement between the engine 13 and the pump power take-off 16. It will be understood that the oil casings 23 and 24 may be connected in oil-tight relation with suitable structures carried by the hoisting equipment 11 and pump power take-off mechanism 16, respectively, in a manner similar to that described with reference to the connection between the casing 23 and the supporting ring 56 carried by the housing 34. The chains 17, 18 and 19 are usually run in a bath of oil by directing a stream of oil upon each of the chains and this oil collects in the bottom of the oil casings and is again returned to the chains by mechanism (not shown). The oil casings must, therefore, be maintained substantially oil-tight and it will be apparent that the bearing and shaft structure of the present invention provides for an extremely simple oil casing structure which enables the casings to be maintained in oil-tight condition while at the same time permitting relative movement between the various units of the apparatus.

In the operation of the device of the present invention the motor 12 can be employed to drive the hoisting equipment 11 through the chain 17 by clutching the shaft 20 to engine 12 through its associated friction clutch 38. Similarly, the engine 13 can be employed to drive the pump power take-off 16 by clutching the shaft 22 to the engine 13 through its associated friction clutch 38. The two engines 12 and 13 can be interconnected by clutching the sprocket 39 to the shaft 20 through the positive clutch including the clutch ring 42. Although the shaft 22 may be provided with a sprocket 39 loosely journaled upon such shaft and engaging the sprocket chain 19, it will be apparent that a sprocket similar to the sprocket 39 of Fig. 3 can be keyed directly to the shaft 22 as there is no necessity of providing a clutch at both ends of the sprocket chain 19. When the two engines 12 and 13 are thus interconnected through the chain 19, both of them can be employed for driving either the hoisting equipment 11 or the pump power take-off 16 or both.

It will be apparent that connecting the shaft 20 in driving relationship with the flywheel 29 by the clutch 38 will render the bearing 28 inactive and that the sole bearing support for the shaft 20 under these circumstances is the bearing 32. As this bearing is supported in the housing 34 rigidly secured to the frame of the internal combustion engine, this bearing may be maintained in accurate alignment with the bearing 28 and the crankshaft of the engine. Since both the sprockets 39 and 47 are positioned very close to bearing 33 and the bearing 28 is positioned a much larger distance from either of the sprockets 39 or 47, the bearing 28 is subjected to much lighter loads than the bearing 33, irrespective of whether it is functioning as an active bearing or an inactive bearing. The bearing 28 can, therefore, be made relatively small in comparison to the bearing 33 which sustains substantially all of the load on the shaft 20.

When the engines 12 and 13 are moved longitudinally of the frame 10 relative to each other for adjustment of chain tension, the telescope joint between the extensions 53 of the housings 34 and the oil casing 26 provides for such movement. When the engine 12 is moved longitudinally of the frame 10 relative to the hoisting equipment 11, the elongated apertures 59 in the oil casing 23 permit such movement, and similarly when the engine 13 is moved with respect to the pump power take-off mechanism 16 or this mechanism is moved with respect to the engine 13, similar elongated apertures 59 in the oil shield 24 permit such movement.

While I have disclosed the preferred embodiment of my invention, it is understood that the details thereof may be varied within the scope of the following claims:

I claim:

1. A power take-off for a prime mover having a frame and a main shaft, a power take-off shaft in alignment with said main shaft and having one end supported by said main shaft for rotation of said power take-off shaft relative to said main shaft, clutch means for releasably connecting said power take-off shaft to said main shaft for rotation therewith, a bearing for the other end of said power take-off shaft, a member rigidly secured to said frame for supporting said bearing, and power transferring elements carried by said power take-off shaft on opposite sides of said bearing and closely adjacent thereto.

2. A power take-off for a prime mover having a frame and a main shaft, a power take-off shaft in alignment with said main shaft and having one end supported by said main shaft for rotation of said power take-off shaft relative to said main shaft, clutch means for releasably connecting said power take-off shaft to said main shaft for rotation therewith, a bearing supporting the other end of said power take-off shaft, a member rigidly secured to said frame for supporting said bearing and power transferring elements carried by said power take-off shaft on opposite sides of said bearing and closely adjacent thereto.

3. A power take-off for a prime mover having a frame and a main shaft, a power take-off shaft in alignment with said main shaft and having one end supported by said main shaft for rotation of said power take-off shaft relative to said main shaft, a clutch mechanism for connecting said power take-off shaft to said main shaft for rotation therewith, a bearing supporting the other end of said power take-off shaft, a member rigidly secured to said frame for supporting said bearing, and power transferring elements carried by said power take-off shaft on opposite sides of said bearing and closely adjacent thereto, said main shaft and said bearing constituting the sole support for said power take-off shaft.

4. A power take-off for a prime mover having a frame and a main shaft, a power take-off shaft in alignment with said main shaft and having one end supported by said main shaft for rotation of said power take-off shaft relative to said main shaft, a clutch mechanism for connecting said power take-off shaft to said main shaft for rotation therewith, a bearing supporting the other end of said power take-off shaft, a housing rigidly secured to said frame for supporting said bearing, said bearing being positioned in an aperture in the end of said housing remote from said frame and power transferring elements carried by said power take-off shaft on opposite sides of said bearing and closely adjacent thereto, said clutch and one of said power transferring elements being positioned in said housing, and a casing supported by said housing and surrounding the other of said power transferring elements.

5. A power take-off for a plurality of prime movers, each having a frame and a main shaft, said prime movers having their main shafts parallel and being movable relative to each other laterally of said main shafts, each of said prime movers having a power take-off shaft in alignment with the main shaft thereof, each of said power take-off shafts having one end supported by its corresponding main shaft, a bearing for said power take-off shaft for supporting the other end thereof, a housing rigidly secured to the frame of each of said prime movers and supporting said bearing for the corresponding power take-off shaft, sprockets on each of said power take-off shafts on opposite sides of said bearings and closely adjacent thereto, one of the sprockets on each of said power take-off shafts being positioned in a corresponding housing, and a chain engaging and connecting the sprockets positioned within said housings and a casing connecting said housings to provide an oil-tight enclosure surrounding said chain, said casing being extensible to provide for relative movement of said prime movers.

6. A power take-off for a plurality of prime movers, each having a frame and a main shaft, said prime movers having their main shafts parallel and being movable relative to each other laterally of said main shafts, each of said prime movers having a power take-off shaft in alignment with the main shaft thereof, each of said power take-off shafts having one end supported by its corresponding main shaft, a bearing for said power take-off shaft for supporting the other end thereof, a housing rigidly secured to the frame of each of said prime movers and supporting said bearing for the corresponding power take-off shaft, sprockets on each of said power take-off shafts on opposite sides of said bearings and closely adjacent thereto, one of the sprockets on each of said power take-off shafts being positioned in a corresponding housing, a chain engaging and connecting the sprockets positioned within said housings and a casing connecting said housings to provide an oil-tight enclosure surrounding said chain, said casing being extensible to provide for relative movement of said prime movers, a chain engaging the other sprocket on each of said power take-off shafts and an oil-tight casing for each of said chains secured to a corresponding one of said housings.

7. A power take-off for a plurality of prime movers, each having a frame and a main shaft, said prime movers having their main shafts parallel and being movable relative to each other laterally of said main shafts, each of said prime movers having a power take-off shaft in alignment with the main shaft thereof, each of said power take-off shafts having one end supported by its corresponding main shaft, a bearing for said power take-off shaft for supporting the other end thereof, a housing rigidly secured to the frame of each of said prime movers and supporting said bearing for the corresponding power take-off shaft, sprockets on each of said power take-off shafts on opposite sides of said bearings and closely adjacent thereto, one of the sprockets on each of said power take-off shafts being positioned in a corresponding housing, a chain engaging and connecting the sprockets positioned within said housings and a casing connecting said housings to provide an oil-tight enclosure surrounding said chain, said casing being extensible to provide for relative movement of said prime movers, one of said sprockets engaged by said chain being loosely journaled upon its corresponding power take-off shaft, and means for releasably connecting said last named sprocket to its corresponding power take-off shaft.

8. A power take-off for a plurality of prime movers, each having a frame and a main shaft, said prime movers having their main shafts parallel and being movable relative to each other laterally of said main shafts, each of said prime movers having a power take-off shaft in alignment with the main shaft thereof, each of said power take-off shafts having one end supported by its corresponding main shaft for rotation relative to said corresponding main shaft, a clutch mechanism for releasably connecting each of said power take-off shafts to its corresponding main shaft, a bearing for said power take-off shaft for supporting the other end thereof, a housing rigidly secured to the frame of each of said prime movers and supporting said bearing for the corresponding power take-off shaft, sprockets on each of said power take-off shafts on opposite sides of said bearings and closely adjacent thereto, one of the sprockets on each of said power take-off shafts being positioned in a corresponding housing, and a chain engaging and connecting the sprockets positioned within said housings and a casing connecting said housings to provide an oil-tight enclosure surrounding said chain, said casing being extensible to provide for relative movement of said prime movers.

9. A power take-off for a plurality of prime movers, each having a frame and a main shaft, said prime movers having their main shafts parallel and being movable relative to each other laterally of said main shafts, each of said prime movers having a power take-off shaft in alignment with the main shaft thereof, each of said power take-off shafts having one end supported by its corresponding main shaft for rotation relative to said corresponding main shaft, a clutch mechanism for releasably connecting each of said power take-off shafts to its corresponding main shaft, a bearing for said power take-off shaft for supporting the other end thereof, a housing rigidly secured to the frame of each of said prime movers and supporting said bearing for the corresponding power take-off shaft, sprockets on each of said power take-off shafts on opposite sides of said bearings and closely adjacent thereto, one of the sprockets on each of said power take-off shafts being positioned in a corresponding housing, a chain engaging and connecting the sprockets positioned within said housings and a casing connecting said housings to provide an oil-tight enclosure surrounding said chain, said casing being extensible to provide for relative movement of said prime movers, one of said sprockets engaged by said chain being loosely journaled upon its corresponding power take-off shaft, and means for releasably connecting said last named sprocket to its corresponding power take-off shaft.

HARLAND W. CARDWELL.